United States Patent
Nagaoka et al.

(10) Patent No.: US 7,620,237 B2
(45) Date of Patent: Nov. 17, 2009

(54) POSITION DETECTING APPARATUS AND METHOD OF CORRECTING DATA THEREIN

(75) Inventors: Nobuharu Nagaoka, Nasukarasuyama (JP); Masakazu Saka, Utsunomiya (JP); Masahito Watanabe, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 781 days.

(21) Appl. No.: 11/287,554

(22) Filed: Nov. 23, 2005

(65) Prior Publication Data

US 2006/0114320 A1 Jun. 1, 2006

(30) Foreign Application Priority Data

Nov. 30, 2004 (JP) ............... 2004-347679
Nov. 1, 2005 (JP) ............... 2005-318206

(51) Int. Cl.
*G06K 9/00* (2006.01)
*G06K 9/46* (2006.01)
*G06K 9/66* (2006.01)
*G06K 9/40* (2006.01)
*H04N 15/00* (2006.01)
*H04N 13/00* (2006.01)
*H04N 9/47* (2006.01)
*H04N 7/00* (2006.01)
*H04N 7/18* (2006.01)
*G01B 11/14* (2006.01)
*G01D 18/00* (2006.01)
*G12B 13/00* (2006.01)

(52) U.S. Cl. ............... 382/154; 382/103; 382/153; 382/190; 382/275; 348/42; 348/118; 348/148; 356/614; 250/252.1

(58) Field of Classification Search ............... 382/103, 382/153–154, 181, 190, 254, 275; 348/42–47, 348/113, 118, 143, 148; 356/614–624; 250/252.1
See application file for complete search history.

(56) References Cited

U.S. PATENT DOCUMENTS

| | | | |
|---|---|---|---|
| 6,014,608 A * | 1/2000 | Seo ............... | 701/207 |
| 6,025,790 A | 2/2000 | Saneyoshi | |
| 6,265,991 B1 * | 7/2001 | Nishiwaki et al. ............... | 340/903 |
| 6,327,536 B1 * | 12/2001 | Tsuji et al. ............... | 701/301 |
| 6,373,518 B1 | 4/2002 | Sogawa | |
| 6,385,334 B1 * | 5/2002 | Saneyoshi et al. ............... | 382/154 |
| 6,385,536 B2 * | 5/2002 | Kimura ............... | 701/209 |

(Continued)

FOREIGN PATENT DOCUMENTS

DE 100 33 599 A1 2/2001

(Continued)

*Primary Examiner*—Matthew C Bella
*Assistant Examiner*—Nathan Bloom
(74) *Attorney, Agent, or Firm*—Carrier, Blackman & Associates, P.C.; Joseph P. Carrier; William D. Blackman

(57) ABSTRACT

Two aiming targets are arranged at positions that are away from two infrared cameras by a predetermined distance. One of the infrared cameras images one of the aiming targets, and the other of the infrared cameras images the other of the aiming targets. Assuming that the obtained images relate to an image of one aiming target, a parallax offset value is calculated. The correction of position is performed based on the parallax offset value.

8 Claims, 13 Drawing Sheets

U.S. PATENT DOCUMENTS

| | | | |
|---|---|---|---|
| 6,531,959 B1 | 3/2003 | Nagaoka et al. | |
| 6,546,115 B1 * | 4/2003 | Ito et al. | 382/100 |
| 6,594,600 B1 * | 7/2003 | Arnoul et al. | 702/94 |
| 6,658,150 B2 * | 12/2003 | Tsuji et al. | 382/218 |
| 6,683,969 B1 * | 1/2004 | Nishigaki et al. | 382/104 |
| 6,690,011 B2 | 2/2004 | Watanabe et al. | |
| 6,785,403 B1 * | 8/2004 | Murakami et al. | 382/104 |
| 6,956,503 B2 * | 10/2005 | Yokokohji et al. | 340/988 |
| 7,130,448 B2 | 10/2006 | Nagaoka et al. | |
| 7,141,796 B2 | 11/2006 | Hattori et al. | |
| 7,233,233 B2 | 6/2007 | Taniguchi et al. | |
| 2001/0002936 A1 | 6/2001 | Tsuji et al. | |
| 2003/0007074 A1 | 1/2003 | Nagaoka et al. | |
| 2003/0169917 A1 * | 9/2003 | Ishiyama | 382/154 |
| 2003/0169918 A1 * | 9/2003 | Sogawa | 382/154 |
| 2004/0066965 A1 | 4/2004 | Watanabe et al. | |
| 2004/0183906 A1 | 9/2004 | Nagaoka et al. | |
| 2005/0063565 A1 | 3/2005 | Nagaoka et al. | |
| 2005/0276450 A1 | 12/2005 | Taniguchi et al. | |

FOREIGN PATENT DOCUMENTS

| | | |
|---|---|---|
| DE | 102 28 638 A1 | 1/2003 |
| DE | 102 47 371 A1 | 7/2003 |
| DE | 103 01 469 A1 | 9/2003 |
| DE | 103 01 468 A1 | 10/2003 |
| DE | 10 2004 012 811 A1 | 11/2004 |
| DE | 10 2004 041 919 A1 | 4/2005 |
| DE | 10 2005 026 875 A1 | 1/2006 |
| DE | 10 2005 026 876 A1 | 6/2006 |
| EP | 1 089 054 A2 | 4/2001 |
| EP | 1 245 443 A2 | 10/2002 |
| FR | 97 13375 | 10/1997 |
| JP | 01-273113 | 11/1989 |
| JP | 06-253204 | 9/1994 |
| JP | 08-086613 | 4/1996 |
| JP | 08-210816 | 8/1996 |
| JP | 08210816 A * | 8/1996 |
| JP | 08-276787 | 10/1996 |
| JP | 08-293029 | 11/1996 |
| JP | 10-115518 | 5/1998 |
| JP | 10-341458 | 12/1998 |
| JP | 11-083475 | 3/1999 |
| JP | 11-083530 | 3/1999 |
| JP | 11-259632 | 9/1999 |
| JP | 11-325889 | 11/1999 |
| JP | 2000-003448 | 1/2000 |
| JP | 2001-91984 | 4/2001 |
| JP | 2001-506369 | 5/2001 |
| JP | 2001-160144 | 6/2001 |
| JP | 2001-211449 | 8/2001 |
| JP | 2002-005626 | 8/2001 |
| JP | 2001-272210 | 10/2001 |
| JP | 2001-289654 | 10/2001 |
| JP | 2001-351193 | 12/2001 |
| JP | 2002-005656 | 1/2002 |
| JP | 2002-290234 | 1/2002 |
| JP | 2002-250770 | 9/2002 |
| JP | 2003-141520 | 5/2003 |
| JP | 2003-216937 | 7/2003 |
| JP | 3515926 | 1/2004 |
| JP | 2004-128887 | 4/2004 |
| JP | 2004-132870 | 4/2004 |
| JP | 2004-239791 | 8/2004 |

* cited by examiner

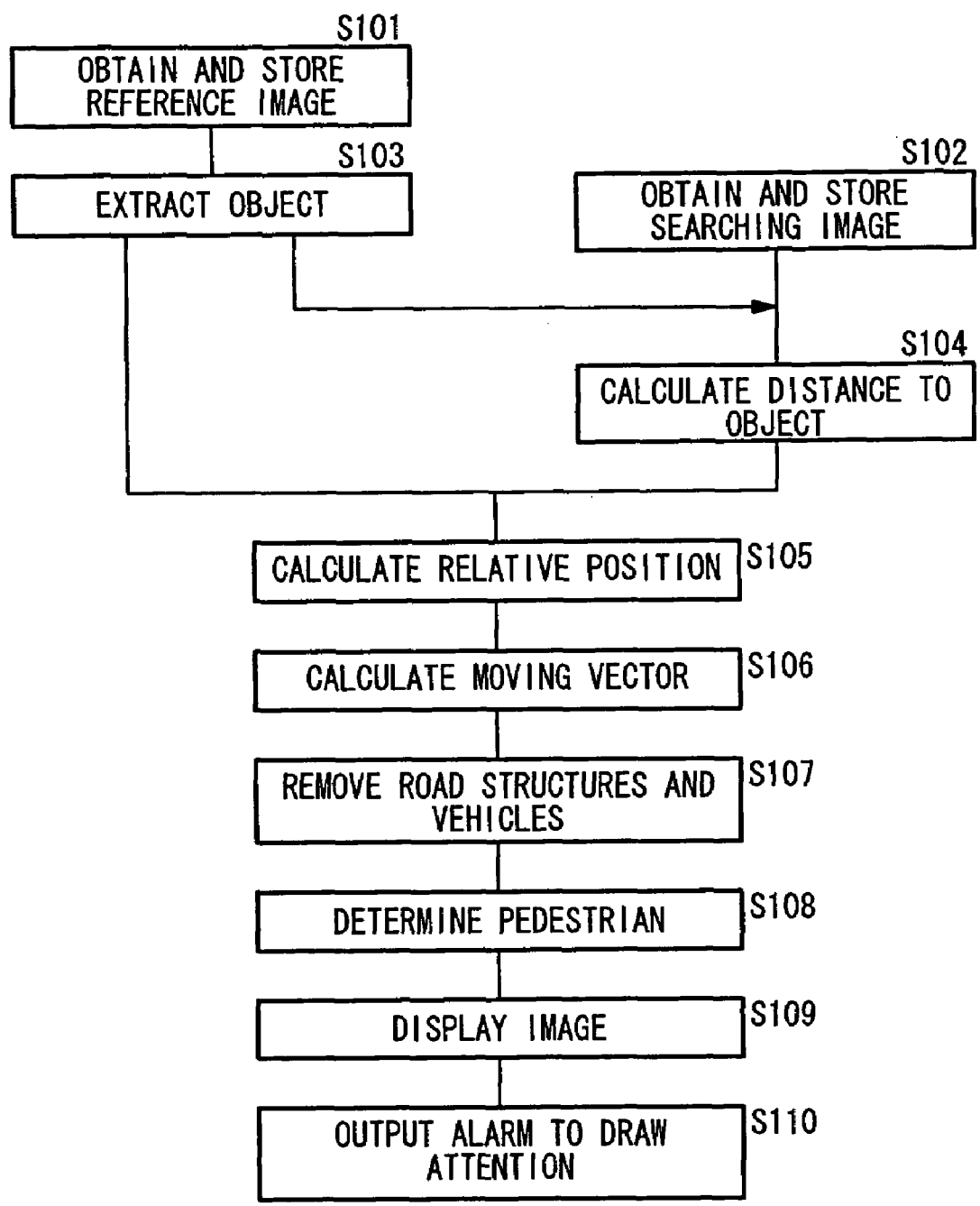

POSITION DETECTING APPARATUS AND METHOD OF CORRECTING DATA THEREIN

BACKGROUND OF THE INVENTION

1. Field of the Invention

The present invention relates to a position detecting apparatus which obtains images of one object with a plurality of imaging units for detecting the position in an actual space of the object, and a method of correcting data in the position detecting apparatus.

2. Description of the Related Art

There has been developed a vehicle vicinity monitoring apparatus for obtaining images of one object with two imaging units mounted on a vehicle, for example, either measuring the distance up to the object based on the parallax between the obtained images, or measuring the position in an actual space of the object with respect to the vehicle, and informing the driver of whether there is an obstacle ahead of the vehicle or not (see Japanese Laid-Open Patent Publication No. 2003-216937).

In this invention, a distance Z from the imaging units to the object can be calculated by an equation (1) below using an ideal perspective transformation model in which the optical axes of the imaging units are parallel to each other, where f is a focal length of each of the imaging units, p is a pixel pitch of the images obtained by the imaging units, B is a base length between the imaging units, and dn is a parallax between the object images obtained by the imaging units.

$$Z = f/p \cdot B/dn \qquad (1)$$

When the optical axes of the imaging units are not parallel to each other, i.e., a relative pan angle between the imaging units is not zero, an error is included in the parallax based on the relative pan angle. Thus, the distance Z cannot be accurately measured based on the parallax. To avoid this defect, it is conceivable that the optical axes of the imaging units are adjusted to be parallel to each other. However, an adjustment apparatus is required for adjusting the optical axes, and it may cost much undesirably.

Meanwhile, another method is also proposed as follows. It is assumed that the focal length f of each of the imaging units, the pixel pitch p and the base length B are measured easily. An object away from imaging units by the distance Z is imaged by the imaging units, and the parallax including an error is calculated from the two obtained object images. The difference between a theoretical parallax dn obtained from the equation (1) with reference to the difference Z and an actual parallax including the error obtained from the images is obtained. The difference is set as a parallax corrective value. In this case, the distance to the object can be calculated by correcting the parallax even if a relative pan angle is not zero, without any particular adjustment apparatus for adjusting optical axes.

In the above-mentioned method of calculating the parallax corrective value, however, the parallax corrective value cannot be calculated highly accurately if the distance Z at which the object is positioned is not so large, for the relative pan angle considerably affects the parallax. Accordingly, a large measuring space is needed for calculating the desirable parallax corrective value.

SUMMARY OF THE INVENTION

It is a general object of the present invention to provide a position detecting apparatus and a method of correcting data in the position detecting apparatus, which is capable of obtaining a corrective value for correcting an error due to the relative pan angle between optical axes of plural imaging units highly accurately and correcting the position in an actual space of the object with the corrective value, without any adjustment apparatus for adjusting the optical axes.

A primary object of the present invention is to provide a position detecting apparatus and a method of correcting data in the position detecting apparatus, which is capable of obtaining a corrective value of imaging units highly accurately without a large measuring space.

An object of the present invention is to provide a position detecting apparatus and a method of correcting data in the position detecting apparatus, which is capable of obtaining a corrective value by using minimal known information.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a perspective view of a service aiming adjustment apparatus installed in a service factory or the like;

FIG. 15 is a flowchart of an object searching process in a normal mode.

DESCRIPTION OF THE PREFERRED EMBODIMENTS

A position detecting apparatus and a method of correcting data in the position detecting apparatus according to preferred embodiments of the present invention will be described below with reference to the accompanying drawings.

Figure 1:
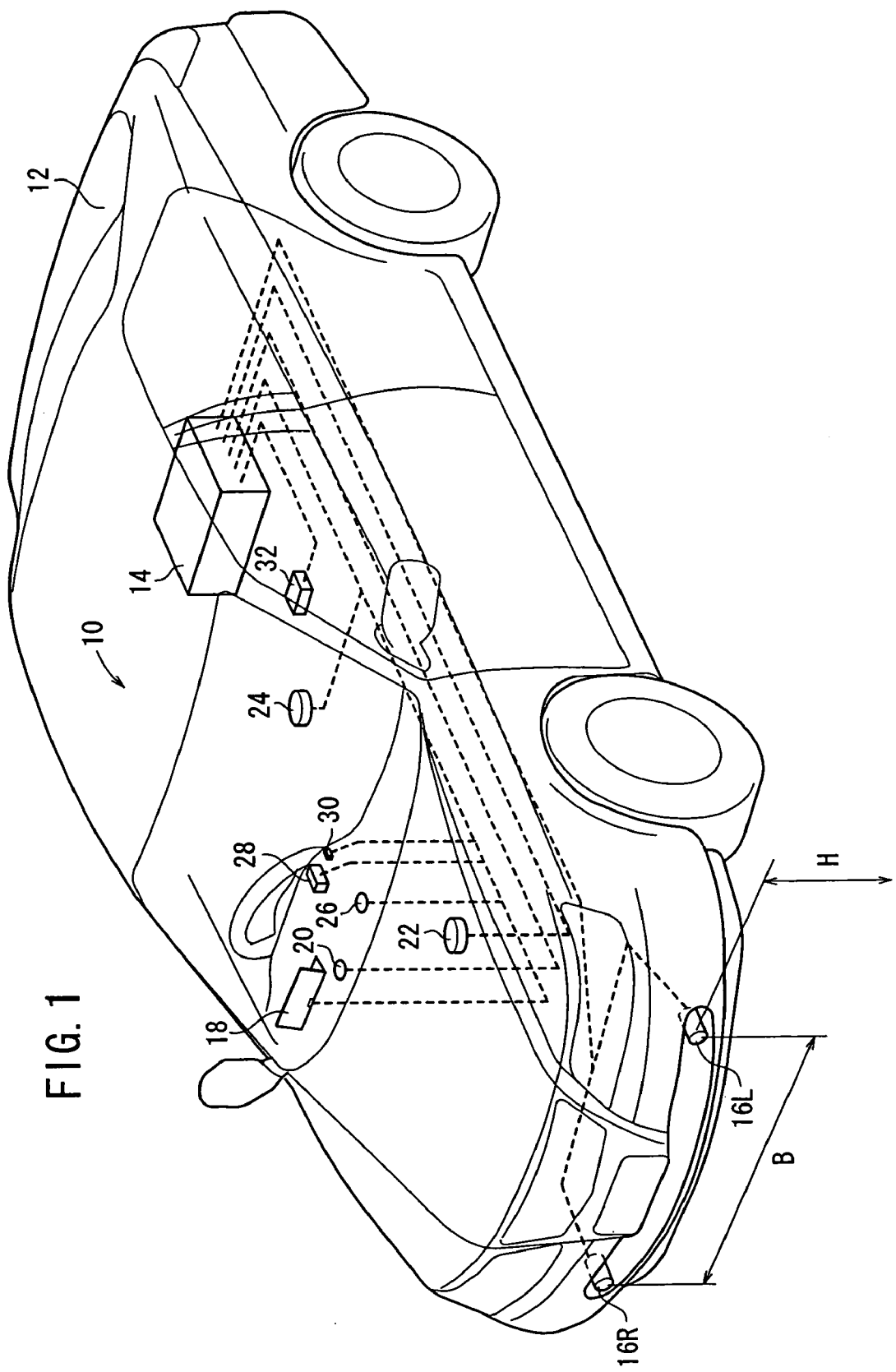
FIG. 1 is a schematic perspective view of a night vision system which incorporates a position detecting apparatus and a method of correcting data in the position detecting apparatus.

As shown in FIG. 1, a night vision system (vehicle vicinity monitoring apparatus) 10 according to an embodiment of the present invention is installed on a vehicle 12. The night vision system 10 has an ECU (Electronic Control Unit) 14 serving as a main controller, a pair of left and right infrared cameras (a first imaging unit, a second imaging unit) 16R, 16L, an HUD (Head-Up Display) 18 for displaying a detected image, a speaker 20 for outputting an alarm sound, a speed sensor 22 for detecting a running speed, a yaw rate sensor 24 for detecting a yaw rate of the vehicle 12 when the vehicle 12 is driven, a solar radiation sensor 26, a headlight switch 28, a main switch 30 for selectively activating and inactivating the night vision system 10, and a connector 32 for connecting the night vision system 10 to an external computer system. These components of the night vision system 10 may be connected to each other by intravehicular communication lines that are used by other systems on the vehicle 12.

The infrared cameras 16R, 16L are mounted respectively in the right and left ends of a horizontal grill hole defined in a lower bumper region. The infrared cameras 16R, 16L are oriented forwardly at respective symmetrical positions and horizontally spaced from each other by an inter-camera distance (also referred to as "base length") B. Each of the infrared cameras 16R, 16L detects far-infrared radiation to obtain an infrared image in which higher-temperature areas represent higher luminance, and supplies the obtained image to the ECU 14.

The HUD 18 is disposed on an upper surface of an instrumental panel at a position directly in front of the driver seated on a driver's seat of the vehicle 12, while trying not to obstruct the front vision of the driver. When the night vision system 10 is turned off, the HUD 18 is retracted down in the instrumental panel. If it is judged that the present time is nighttime based on information from the solar radiation sensor 26 and also that the headlights (or fog lamps) are turned on based on information from the headlight switch 28, then the HUD 18 pops up from the instrumental panel when the main switch 30 is turned on. The HUD 18 has an image display panel comprising a concave mirror for reflecting and projecting an image sent from within the instrumental panel. The night vision system 10 may be automatically activated by an automatic lighting function regardless of whether the main switch 30 is operated or not. The luminance of the image display panel of the HUD 18 may be made adjustable by a suitable switch.

The ECU 14 processes two infrared images obtained by the respective infrared cameras 16R, 16L to detect heat-source objects based on the parallax between the infrared images, and displays the detected heat-source objects as white silhouettes on the HUD 18. When the ECU 14 identifies a pedestrian among the heat-source objects, the ECU 14 controls the speaker 20 to output an alarm sound and also controls the HUD 18 to highlight the identified pedestrian with a surrounding frame having a striking color for thereby drawing the driver's attention. The ECU 14 performs such an attention drawing function at such good timing to allow the driver to take a sufficient danger avoiding action, by predicting a period of time until the vehicle 12 reaches the position of the pedestrian in a predetermined speed range.

In order for the infrared cameras 16R, 16L to be able to accurately determine the positions, distances, and shapes of far heat-source objects, the infrared cameras 16R, 16L are subject to an adjustment process called an aiming process (which will be described later) when they are manufactured in the manufacturing plant or when they are inspected at regular intervals.

Figure 2:
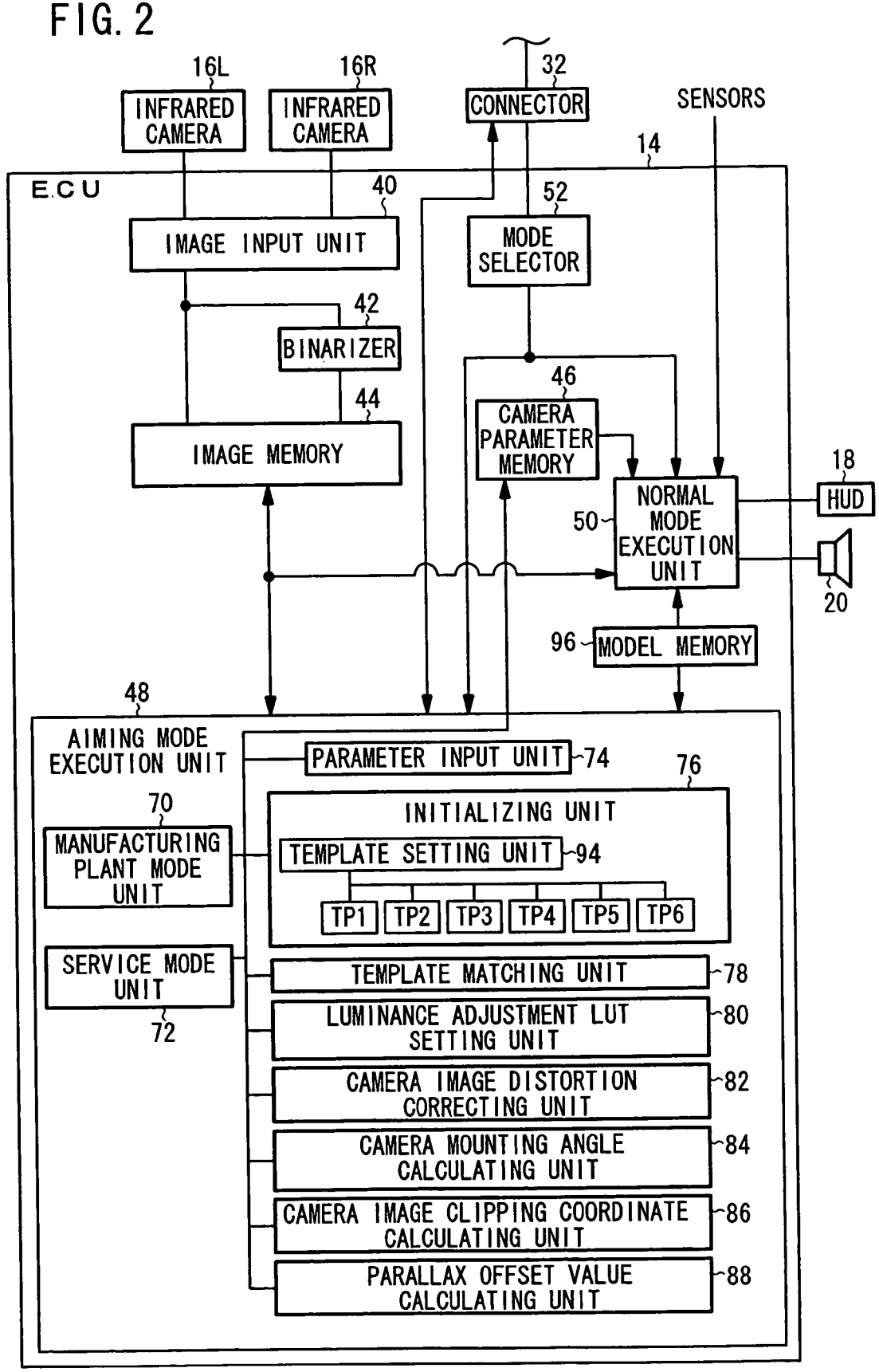
FIG. 2 is a functional block diagram of an ECU of the night vision system shown in FIG. 1.

As shown in FIG. 2, the ECU 14 comprises an image input unit 40 for converting analog infrared images obtained by the respective infrared cameras 16R, 16L into digital gray-scale images, a binarizer 42 for generating binary images from the gray-scale images based on a threshold value, an image memory 44 for storing the binary images and the gray-scale images, an aiming mode execution unit 48 for storing camera parameters produced as a result of the aiming process into a camera parameter memory 46, a normal mode execution unit 50 for performing a normal image processing process while referring to sensors including the speed sensor 22, etc. and the camera parameters stored in the camera parameter memory 46, and controlling the HUD 18 and the speaker 20, and a mode selector 52 for selecting either an aiming mode or a normal mode at a time based on an instruction transmitted from an external computer system through the connector 32.

The normal mode execution unit 50 functions as: an object extracting unit for extracting an object from images obtained by the infrared cameras 16R, 16L; an actual space position calculating unit for calculating the position in an actual space of the object; and an actual space position correcting unit for correcting the position in an actual space of the object by using the camera parameters stored in the camera parameter memory 46.

The aiming mode execution unit 48 has a manufacturing plant mode unit 70 for performing the aiming process with an aiming target control apparatus 100 (see FIG. 3) as the external computer system in the manufacturing plant in which the vehicle 12 is manufactured, and a service mode unit 72 for performing the aiming process with a service aiming adjustment apparatus 120 (see FIG. 4) as the external computer system in a service factory or the like. Either the manufacturing plant mode unit 70 or the service mode unit 72 is selected at a time based on an instruction from a corresponding one of the external computer systems.

The aiming mode execution unit 48 has a parameter input unit 74 for inputting certain parameters from the external computer system when the aiming process is initiated, an initializing unit 76 for making initial settings required by the aiming process, a template matching unit 78 for performing template matching on the gray-scale images stored in the image memory 44, a luminance adjustment LUT setting unit 80 for setting a luminance adjustment LUT for adjusting the luminance of image signals produced by the infrared cameras 16R, 16L, a camera image distortion correcting unit 82 for correcting image distortions caused due to individual differences as to focal lengths, pixel pitches, etc. between the infrared cameras 16R, 16L, a camera mounting angle calculating unit 84 for calculating respective mounting angles (a pan angle and a pitch angle) of the infrared cameras 16R, 16L, a camera image clipping coordinate calculating unit 86 for calculating clipping coordinates used as a reference for clipping processed ranges from images, and a parallax offset value calculating unit 88 for calculating a parallax offset value as an error which is contained in the parallax between object images because the optical axes of the infrared cameras 16R, 16L are not parallel to each other.

The parallax offset value calculating unit 88 functions as: a virtual parallax calculating unit for calculating a distance between different objects in the images obtained by the infrared cameras 16R, 16L as a virtual parallax; a parallax calculating unit (a first parallax calculating unit, a second parallax calculating unit) for calculating each of the parallaxes (a first parallax, a second parallax) in images of each of objects obtained by the infrared cameras 16R, 16L; a corrective value calculating unit (a parallax corrective value calculating unit) for clipping image areas from the images obtained by the infrared cameras 16R, 16L according to respective pan angles thereof and calculating a parallax offset value (a corrective value, a parallax corrective value) for increasing range-finding accuracy.

The initializing unit 76 has a template setting unit 94 for selecting one of six templates TP1, TP2, TP3, TP4, TP5, TP6 (collectively also referred to as "template TP") that have been prepared depending on the distance up to objects. The ECU 14 has a model memory 96 for storing, as a formula, a perspective transformation model for determining the position of an object. The aiming mode execution unit 48 and the normal mode execution unit 50 calculate the position of an imaged object using the perspective transformation model stored in the model memory 96. The model memory 96 stores a short-distance model for objects at short distances and a long-distance model for objects at long distances.

The ECU 14 has a CPU (Central Processing Unit) as a main controller, a RAM (Random Access Memory) and a ROM (Read Only Memory) as a memory device, and other components. The above functions of the ECU 14 are implemented in software when the CPU reads a program and executes the program in cooperation with the memory device.

Figure 3:
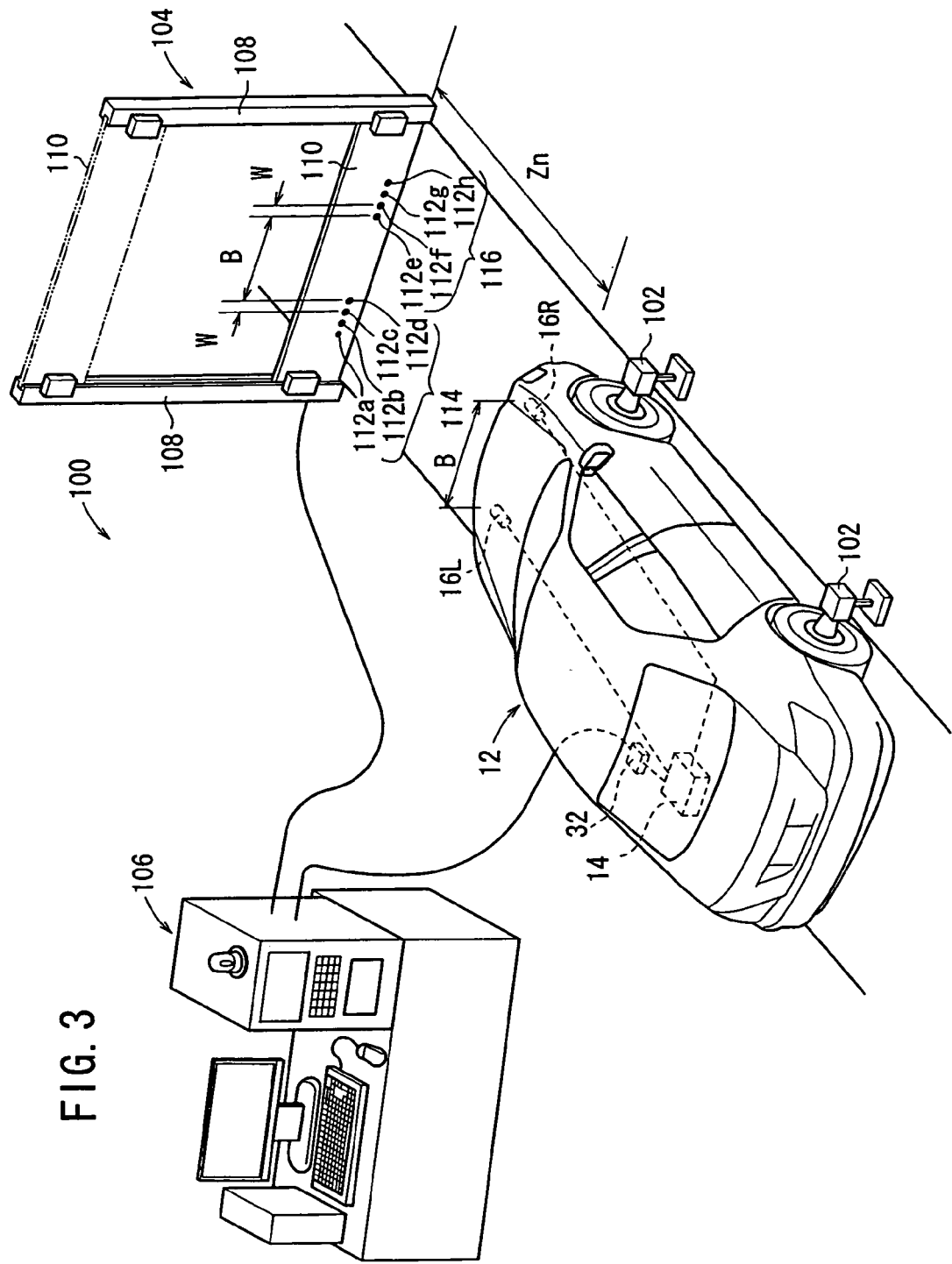
FIG. 3 is a perspective view of an aiming target control apparatus installed in a manufacturing plant.

As shown in FIG. 3, the aiming target control apparatus 100 has positioning devices 102 for positioning the vehicle 12, a gate 104 disposed in a given position in front of the infrared cameras 16R, 16L on the vehicle 12 that is positioned by the positioning devices 102, and a main control device 106 for communicating with the ECU 14 through the connector 32 and controlling the gate 104. The gate 104 has two vertical posts 108 horizontally spaced from each other by a distance which is slightly greater than the width of the vehicle 12, and a horizontally elongate aiming target plate 110 having left and right ends movably supported respectively by the posts 108. The aiming target plate 110 is vertically movable along the posts 108 by the main control device 106. The aiming target plate 110 supports thereon an array of eight aiming targets 112*a* through 112*h* (collectively also referred to as "aiming target 112") as heat sources that are successively arranged horizontally from the left in the order named.

The four left aiming targets 112*a* through 112*d* are spaced at relatively small intervals W and belong to a left target group 114. The four right aiming targets 112*e* through 112*h* are also spaced at the intervals W and belong to a right target group 116. The aiming target 112*d* on the right end of the left target group 114 and the aiming target 112*e* on the left end of the right target group 116 are spaced from each other by a distance which is equal to the base length B (W<B). These aiming targets 112*d*, 112*e* are positioned just in front of the infrared cameras 16L, 16R, respectively.

Figure 4:
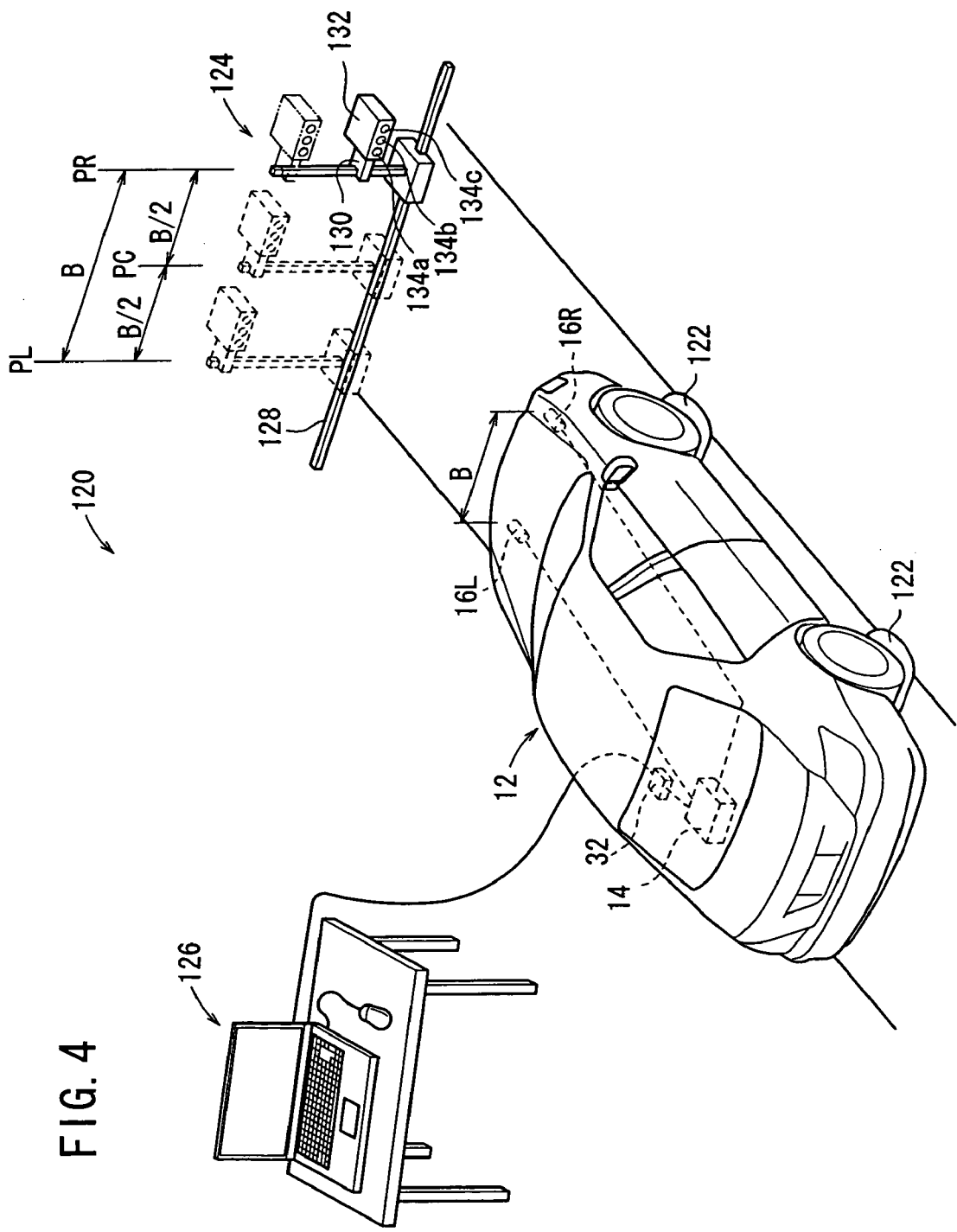

As shown in FIG. 4, the service aiming adjustment apparatus 120 has positioning markers 122 for positioning the vehicle 12, a headlight tester 124 disposed in a given position in front of the infrared cameras 16R, 16L on the vehicle 12 that is positioned based on the positioning markers 122, and a main control device 126 for communicating with the ECU 14 through the connector 32. The headlight tester 124 is movable along a rail 128 in directions parallel to the transverse direction of the vehicle 12 and has a lifter table 130 which is vertically movable. The lifter table 130 supports thereon a target plate 132 having three aiming targets 134*a* through 134*c* (collectively also referred to as "aiming target 134") as heat sources that are successively arranged horizontally. The aiming targets 134*a* through 134*c* are spaced at the intervals W (W<B). The aiming target 134 may be identical to or substantially the same as the aiming target 112 of the gate 104 shown in FIG. 3.

The aiming process to be performed on the night vision system 10 using the aiming target control apparatus 100 or the service aiming adjustment apparatus 120 will be described below.

The aiming process includes a manufacturing plant aiming mode to be performed using the aiming target control apparatus 100 and a service aiming mode to be performed using the service aiming adjustment apparatus 120.

In the manufacturing plant aiming mode, the vehicle 12 is positioned by the positioning devices 102, and the main control device 106 is connected to the connector 32 of the vehicle 12. The main control device 106 sends an instruction for performing the manufacturing plant aiming mode using the aiming target control apparatus 100 to the ECU 14. The aiming targets 112*a* through 112*h* are positionally adjusted to the same height as the infrared cameras 16R, 16L depending on the type of the vehicle 12.

In the service aiming mode, the vehicle 12 is positioned with the wheels aligned with the respective positioning markers 122, and the main control device 126 is connected to the connector 32 of the vehicle 12. The main control device 126 sends an instruction for performing the service aiming mode using the service aiming adjustment apparatus 120 to the ECU 14. The aiming targets 134*a* through 134*c* are positionally adjusted to a predetermined height.

FIGS. 5 through 9 show the aiming process that is mainly performed by the aiming mode execution unit 48 of the ECU 14. The aiming process will be described in detail below with reference to FIGS. 5 through 9.

Figure 5:
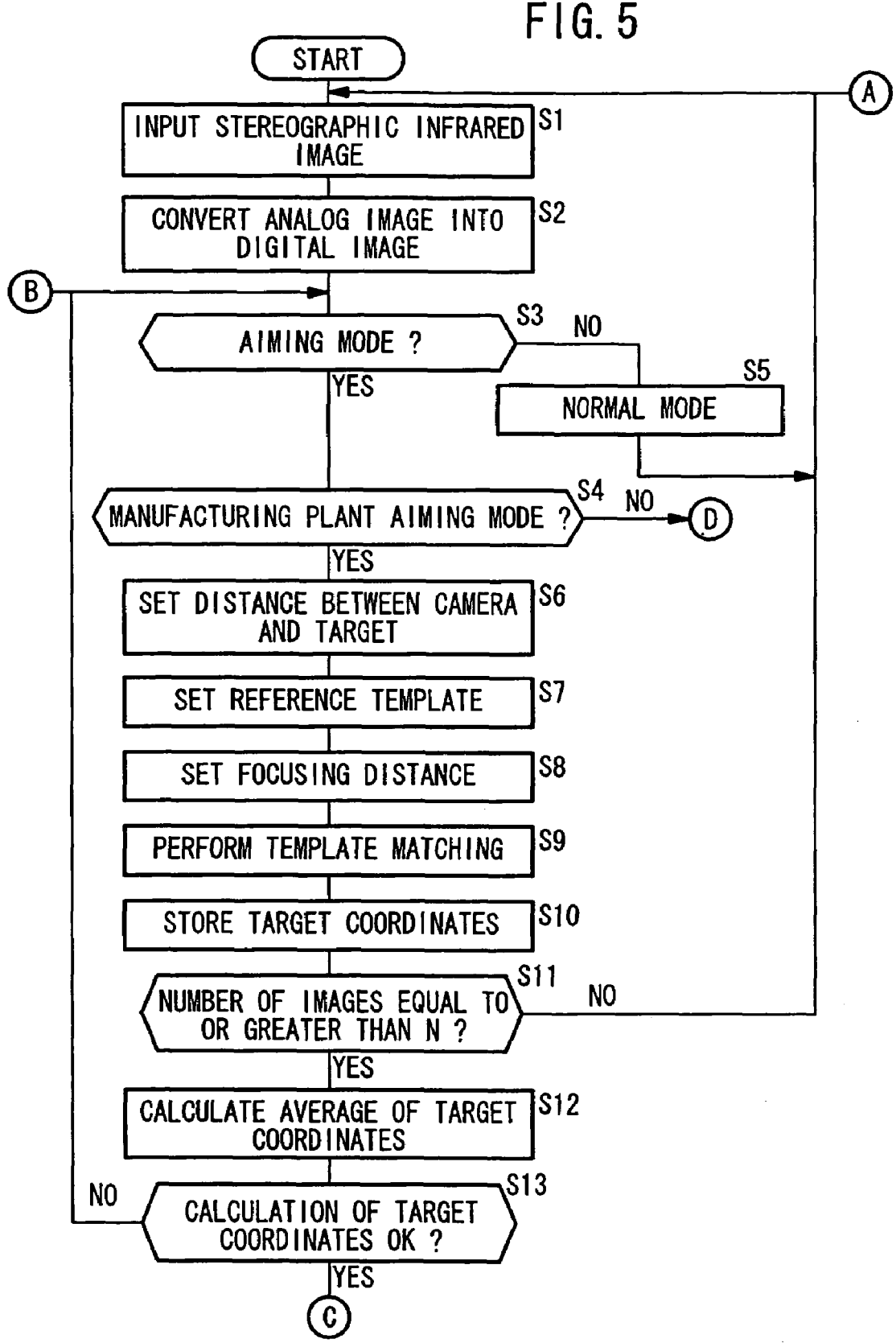
FIGS. 5 through 9 are flowcharts of an aiming process.

In step S1 shown in FIG. 5, an analog stereographic infrared image is input from the infrared cameras 16R, 16L to the image input unit 40. The image input unit 40 converts the analog stereographic infrared image into a digital gray-scale image in step S2. The gray-scale image is stored in the image memory 44. The gray-scale image is converted by the binarizer 42 into a binary image, which is also stored in the image memory 44.

In step S3, the mode selector 52 determines whether the aiming mode or the normal mode is to be executed according to an instruction from the main control device 106 or 126. If the normal mode is to be executed, then control goes to step S5. If the aiming mode is to be executed, then control goes to step S4.

In the normal mode in step S5, the normal mode execution unit 50 operates to refer to the camera parameters stored in the camera parameter memory 46, and controls the HUD 18 and the speaker 20 to search for an object and draw the driver's attention, as described later. Thereafter, control goes back to step S1.

In the aiming mode in step S4, the mode selector 52 determines which of the aiming target control apparatus 100 and the service aiming adjustment apparatus 120 is to be used. If it is judged that the aiming target control apparatus 100 is to be used, then control goes to step S6 in order for the manufacturing plant mode unit 70 to perform the manufacturing plant aiming mode. If it is judged that the service aiming adjustment apparatus 120 is to be used, then control goes to step S30 (see FIG. 7) in order for the service mode unit 72 to perform the service aiming mode. The manufacturing plant aiming mode and the service aiming mode will successively be described below.

In the manufacturing plant aiming mode, a distance Zn from the infrared cameras 16R, 16L to the aiming target plate 110 is set in step S6.

In step S7, the template setting unit 94 selects a reference template from the templates TP1 through TP6 corresponding to the aiming target 112 positioned at the distance Zn.

In step S8, in order to calculate the position of the aiming target 112 using a perspective transformation model corresponding to the distance up to the aiming target 112 disposed at a short distance, a focusing distance (focal length) of the infrared cameras 16R, 16L which matches the perspective transformation model is set.

In step S9, a template matching process is performed based on the template TP selected in step S7. Specifically, correlative calculations are performed on a gray-scale image of the aiming target 112 obtained by the infrared cameras 16R, 16L and the template TP, and coordinates of a gray-scale image or a target for which the results of the correlative calculations are minimum are calculated and stored in step S10.

In step S11, it is confirmed whether the number of acquired gray-scale images has reached a predetermined number N or not. If the number of acquired gray-scale images has reached the predetermined number N, then control goes to step S12. If the number of acquired gray-scale images is smaller than the predetermined number N, then control goes back to step S1 to acquire another gray-scale image and calculate and store target coordinates.

In step S12, the N sets of target coordinates are averaged. If it is judged that target coordinates are properly calculated in step S13, then control goes to step S14 (see FIG. 6). If it is judged that target coordinates are not properly calculated in step S13, then control goes back to step S3.

In step S14, a luminance adjustment LUT is set. Specifically, in order to reliably perform the template matching process based on correlative calculations, the levels of luminance signals of the aiming target 112 which are detected by the infrared cameras 16R, 16L are compared with each other, for example, and a luminance adjustment LUT is set such that the luminance signal from the infrared camera 16R, which is used as a reference for the correlative calculations, will be greater at all times than the luminance signal from the infrared camera 16L at each of the luminance levels. If it is judged that the process of setting a luminance adjustment LUT is properly performed in step S15, then control goes to step S16.

In step S16, an image distortion corrective value for correcting image distortions caused due to individual differences as to focal lengths, pixel pitches, etc. between the infrared cameras 16R, 16L is calculated. If it is judged that an image distortion corrective value is properly calculated in step S17, then control goes to step S18.

In step S18, a pan angle and a pitch angle, which serve as mounting angles of the left and right cameras, i.e., the infrared cameras 16R, 16L, are calculated. If it is judged that mounting angles of the left and right cameras are properly calculated in step S19, then control goes to step S20.

In step S20, clipping coordinates for clipping image areas to be processed from the images obtained by the infrared cameras 16R, 16L are calculated. If it is judged that clipping coordinates are properly calculated in step S21, then control goes to step S22.

In step S22, a parallax offset value, which represents an error contained in the parallax between object images because the optical axes of the infrared cameras 16R, 16L are not parallel to each other, is calculated. If it is judged that a parallax offset value is properly calculated in step S23, then control goes to step S24. The calculation of the parallax offset value will be detailed later.

In step S24, the luminance adjustment LUT, the image distortion corrective value, the pan angle and the pitch angle, the clipping coordinates, and the parallax offset value which are determined respectively in steps S14, S16, S18, S20, and S22 are stored in the camera parameter memory 46. If these parameters are properly stored, then the manufacturing plant aiming mode is finished. At this time, the ECU 14 sends a signal indicating that the manufacturing plant aiming mode is finished to the main control device 106. If the normal mode is to be subsequently executed, then a predetermined restarting process may be performed. If the answers to the branching processes in steps S17, S19, S21, S23, and S25 are negative, then control goes back to step S3 as when the answer to the branching process in step S13 is negative.

The service aiming mode will be described below. In the service aiming mode, steps S1 through S3 (see FIG. 5) are executed in the same manner as with the manufacturing plant aiming mode. Control then branches from step S4 to step S30 for the service mode unit 72 to perform a processing sequence shown in FIGS. 7 through 9.

Figure 7:
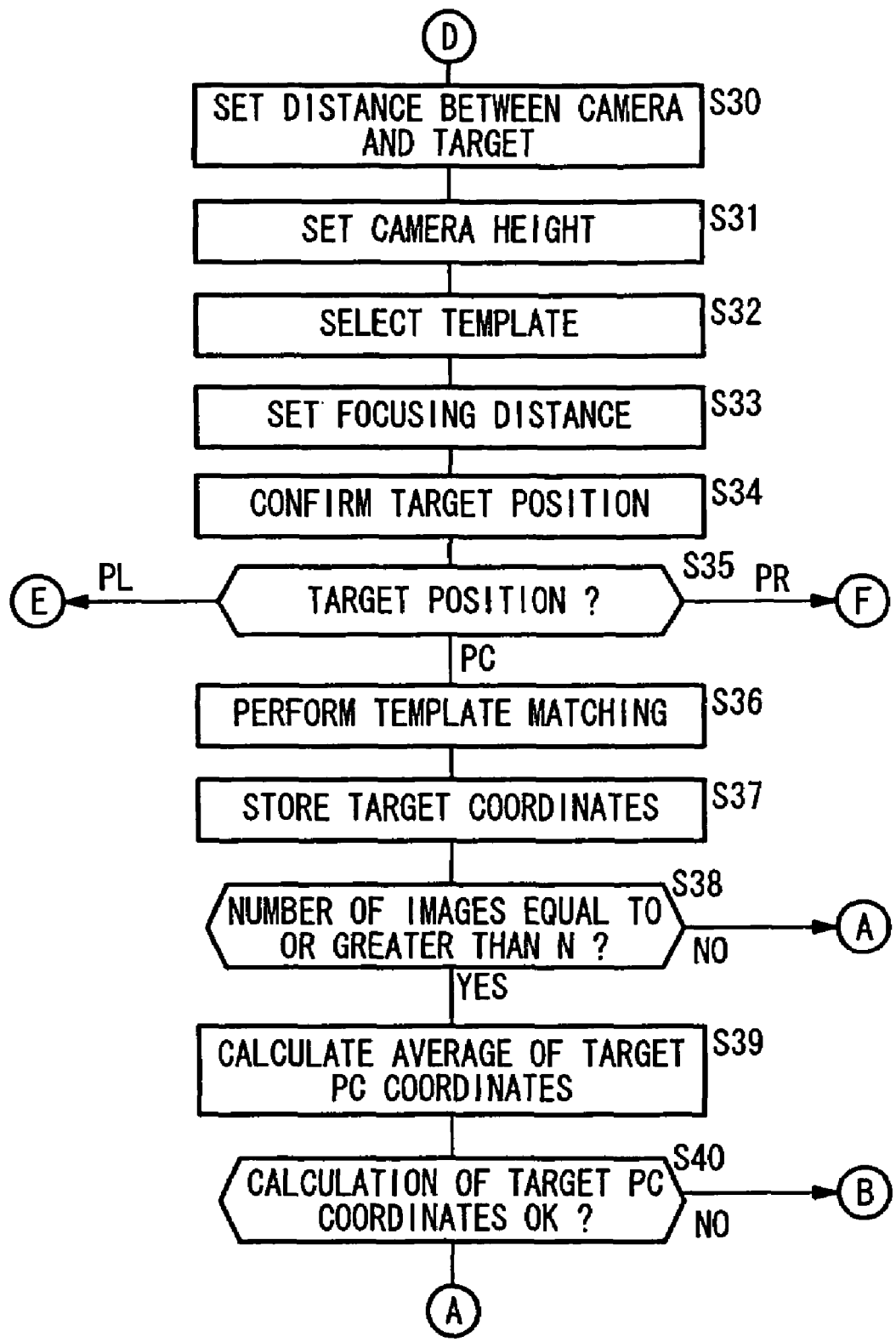

In step S30 shown in FIG. 7, a distance from the infrared cameras 16R, 16L to the target plate 132 is set. The distance from the infrared cameras 16R, 16L to the target plate 132 is determined by the position of the aiming target 134 installed in a service factory where the service aiming mode is performed. The distance is input from the main control device 126 to the ECU 14.

In step S31, the height H (see FIG. 1) of the infrared cameras 16R, 16L is confirmed and input.

In step S32, the template setting unit 94 selects one of the templates TP1 through TP6 which corresponds to the distance to the aiming target 134 set in step S30.

In step S33, a focusing distance matching the perspective transformation model which corresponds to the distance to the aiming target 134 is set in the same manner as with step S8.

In step S34, the position of the target plate 132 is confirmed. Specifically, in the service aiming mode, the target plate 132 is placed successively in a central position PC, a left position PL, and a right position PR (see FIG. 4). When step S34 is executed for the first time, a signal for positional confirmation is sent to the main control device 126 to place the target plate 132 in the central position PC. In response to the signal, the main control device 126 displays a message "PLACE TARGET IN CENTRAL POSITION PC AND PRESS "Y" KEY" on the monitor screen, for example. According to the message, the operator moves the headlight tester 124 along the rail 128 either manually or with a given actuator until the target plate 132 is placed in the central position PC.

In step S35, control is branched depending on the position of the target plate 132 at the time. If the target plate 132 is placed in the central position PC (in first through 30 cycles), then control goes to step S36. If the target plate 132 is placed in the left position PL (in 31st through 60th cycles), then control goes to step S41 (see FIG. 8). If the target plate 132 is placed in the right position PR (in 61st and subsequent cycles), then control goes to step S46 (see FIG. 9).

In step S36, a template matching process is performed in the same manner as with step S9.

In step S37, target coordinates of the aiming target 134 are calculated and stored in the same manner as with step S10.

In step S38, the number of acquired gray-scale images is confirmed in the same manner as with step S11. If the number of acquired gray-scale images is N or more, then control goes to step S39. If the number of acquired gray-scale images is smaller than N, then control goes back to step S1. In the second and subsequent cycles, steps S3 through S8 and steps S30 through S35 are skipped.

In step S39, the target coordinates at the central position PC are averaged in the same manner as with step S12. If it is judged that target coordinates are normally calculated in step S40, then control goes back to step S1. If target coordinates are not normally calculated in step S40, then control goes back to step S3.

Figure 8:
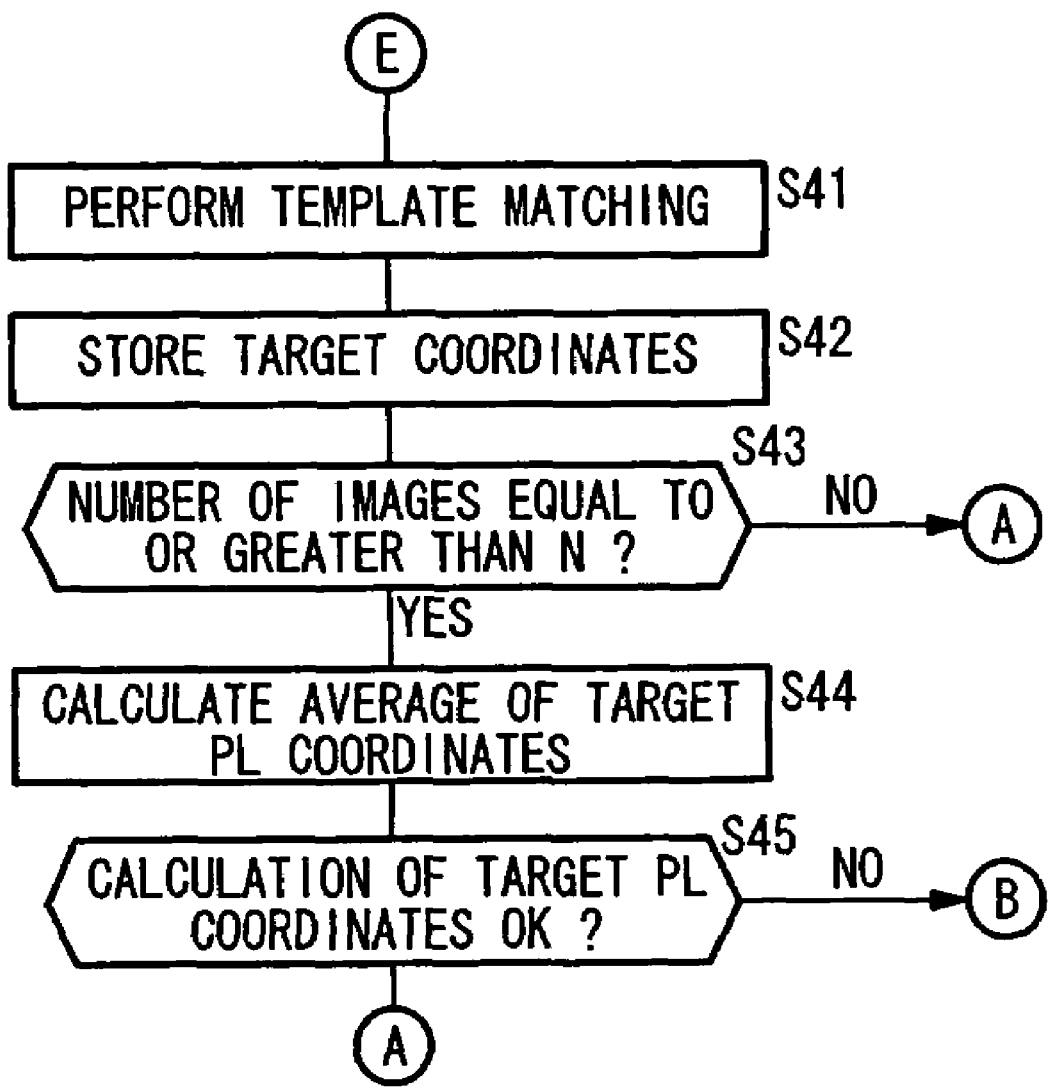

The target plate 132 is placed in the left position PL, and steps S41 through S45 shown in FIG. 8 are similarly executed.

Figure 9:
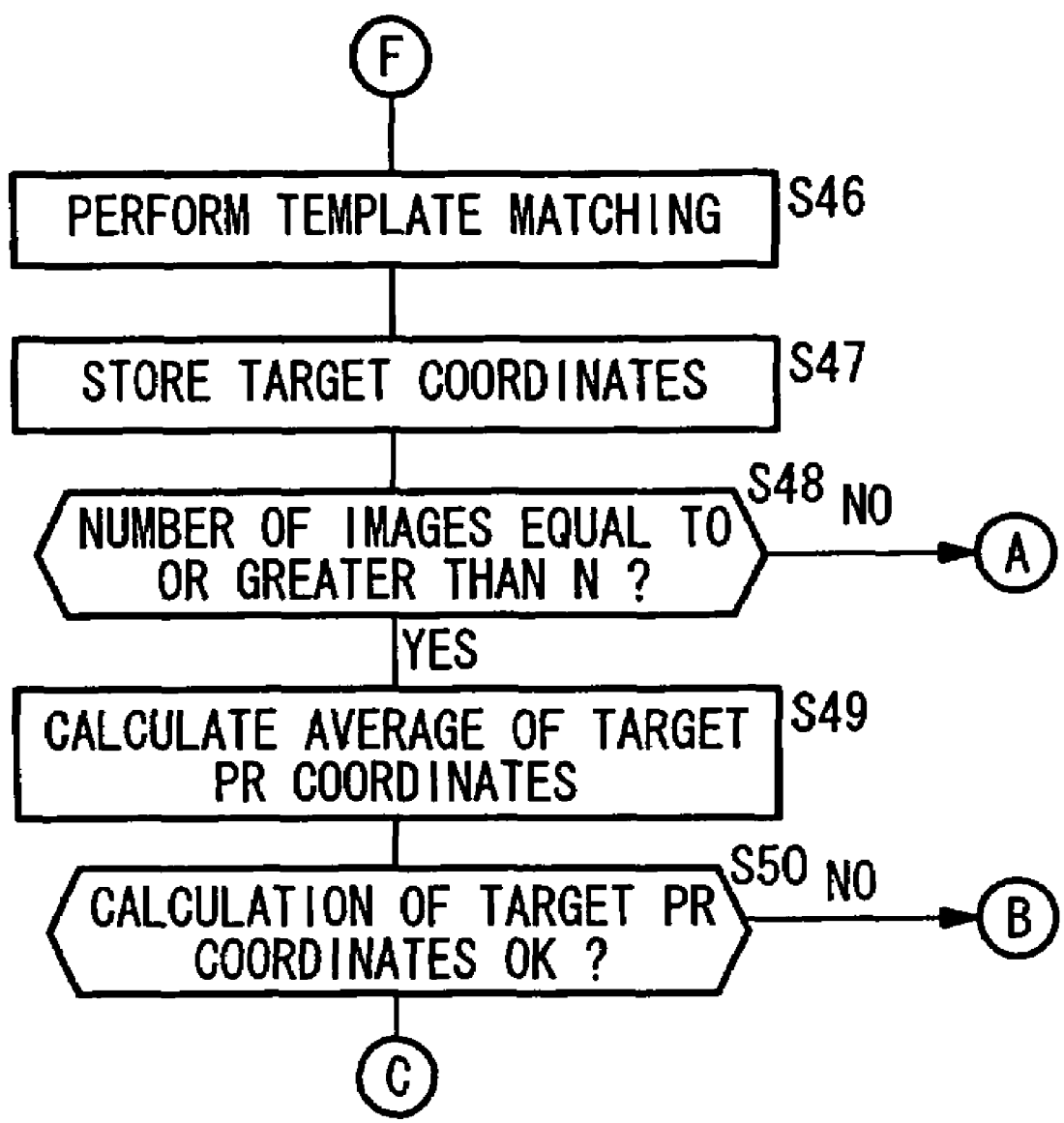

Then, the target plate 132 is placed in the right position PR, and steps S46 through S50 shown in FIG. 9 are similarly executed.

Figure 6:
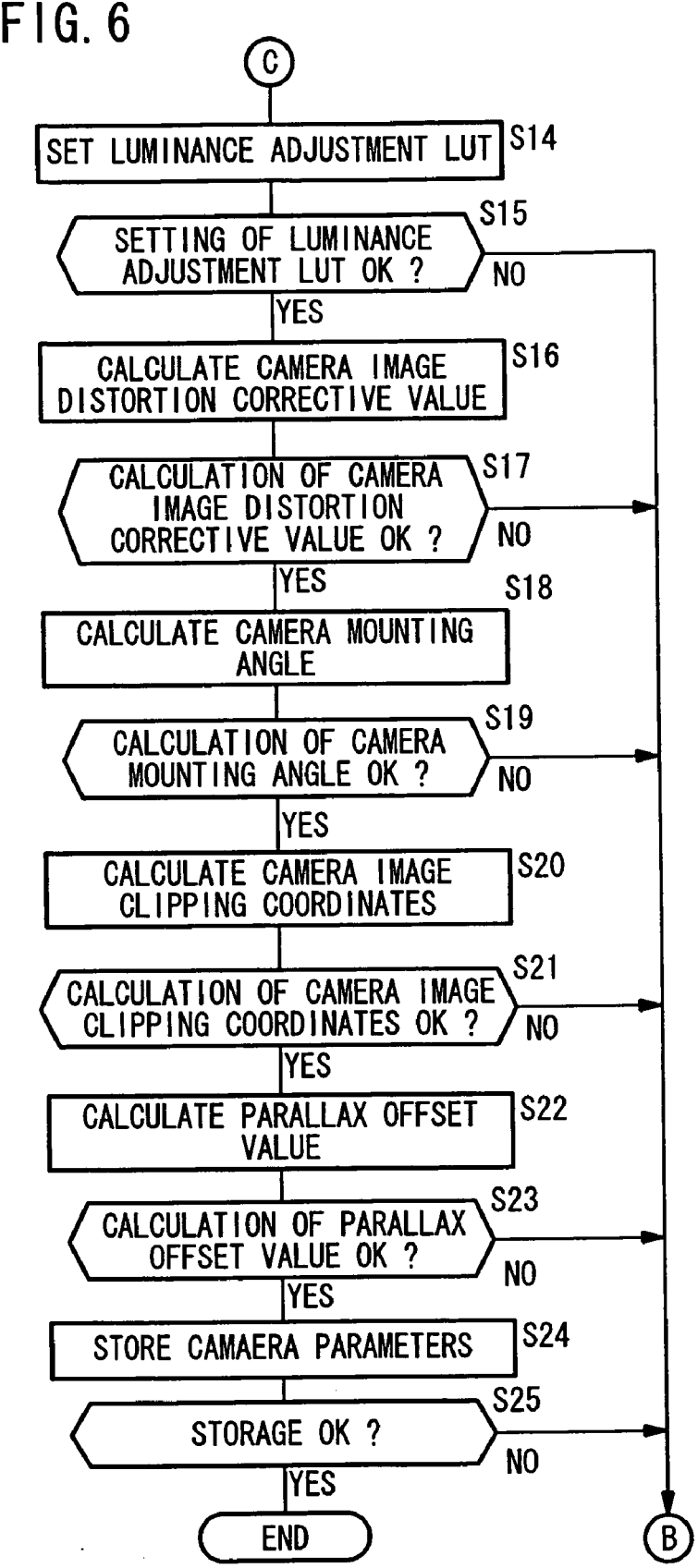

If it is judged that target coordinates are normally calculated in final step S50, then control goes back to step S14 (see FIG. 6). Subsequently, the same process as the manufacturing plant aiming mode is performed, and camera parameters are stored in the camera parameter memory 46.

The calculation of the parallax offset value (a parallax corrective value) in step S22 will be described below in detail with reference to FIGS. 10 and 11. A parallax dn is obtained when one object is imaged by the infrared cameras 16R, 16L, supposing that the optical axes of the infrared cameras 16R, 16L are parallel to each other and a relative pan angle θ between the infrared cameras 16R, 16L is zero (0). The parallax offset value is an error which is obtained for the parallax dn when a relative pan angle θ is not zero. This error will be referred to as a parallax offset value α below.

Figure 10:
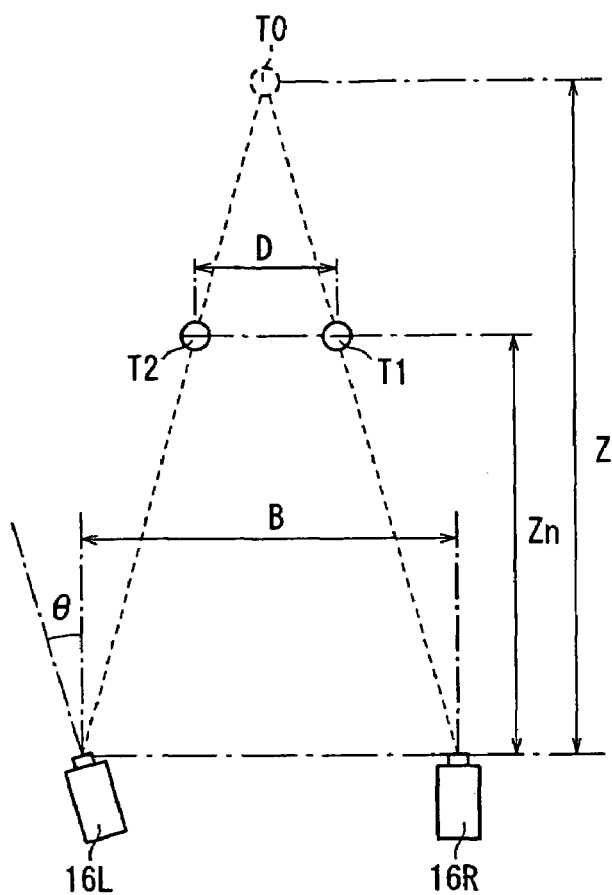
FIG. 10 is a diagram illustrative of a positional relationship of infrared cameras and aiming targets for calculating a parallax corrective value.
Figure 11:
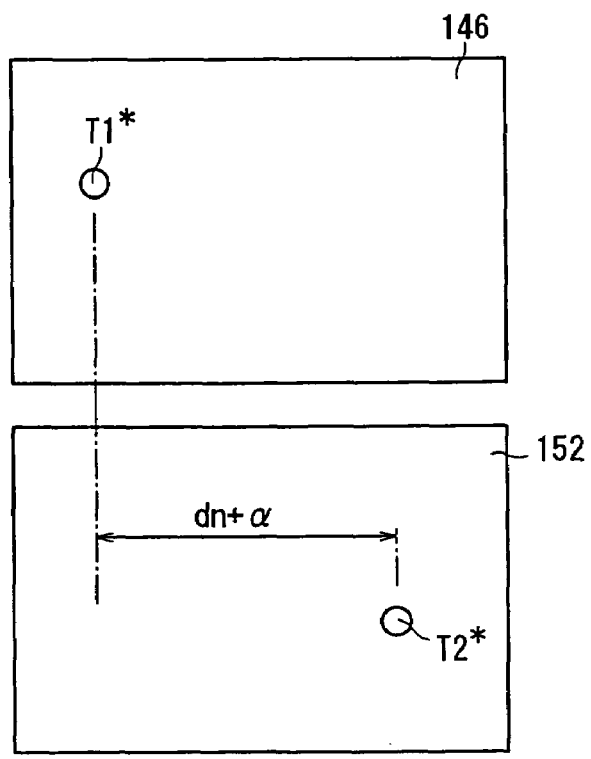
FIG. 11 is a diagram illustrative of a reference image and a searching image obtained in the positional relationship shown in FIG. 10.

First, the infrared cameras 16R, 16L and two aiming targets T1, T2 (a first object, a second object) are arranged as shown in FIG. 10. The aiming targets T1, T2 are away from the infrared cameras 16R, 16L by a predetermined distance Zn (a second distance). A distance D (a first distance) between the aiming targets T1, T2 is smaller than or equal to the base length B of the inter-camera distance (D≦B). When D=B, the aiming targets 112*d*, 112*e* shown in FIG. 3 may be used as the aiming targets T1, T2, for example.

The infrared camera 16R images the aiming target T1, and the infrared camera 16L images the aiming target T2. Assuming that the aiming targets T1, T2 are the same object, this arrangement is supposed to be equivalent to an arrangement where one aiming target T0 is away from the infrared cameras 16R, 16L by a distance Z. The distance Z is obtained as follows.

$$Z = B/(B-D) \cdot Zn \qquad (2)$$

In ideal condition where a relative pan angle θ between the infrared cameras 16R, 16L can be assumed to be 0°, when the aiming targets T1, T2 are imaged by the infrared cameras 16R, 16L, a reference virtual parallax dn between the images obtained by the infrared cameras 16R, 16L can be calculated with an equation (3) by using the equations (1) and (2) as follows.

$$dn = f/p \cdot (B-D)/Zn \qquad (3)$$

On the other hand, in general condition where the relative pan angle θ between the infrared cameras 16R, 16L is not 0°, the aiming targets T1, T2 are imaged by the infrared cameras 16R, 16L. Then, a virtual parallax (dn+α) is calculated. The virtual parallax (dn+α) is defined in the direction in which the base length is obtained, between a target image T1* of the reference image 146 imaged by the infrared camera 16R and a target image T2* of the searching image 152 imaged by the infrared camera 16L. The value α is a parallax offset value when the relative pan angle θ is not 0°. The parallax offset value a due to the relative pan angle θ is obtained by the difference between the calculated virtual parallax (dn+α) and the reference virtual parallax dn obtained by the equation (3). The calculated parallax offset value α is stored as a parallax corrective value in the camera parameter memory 46.

The "virtual" parallax (or the reference "virtual" parallax) shows the distance between the different aiming targets T1, T2 obtained by the different infrared cameras 16R, 16L in the images. On the other hand, a parallax shows a distance between the same aiming targets or objects in the images obtained by the different infrared cameras 16R, 16L. These values are distinguished from each other.

Figure 12:
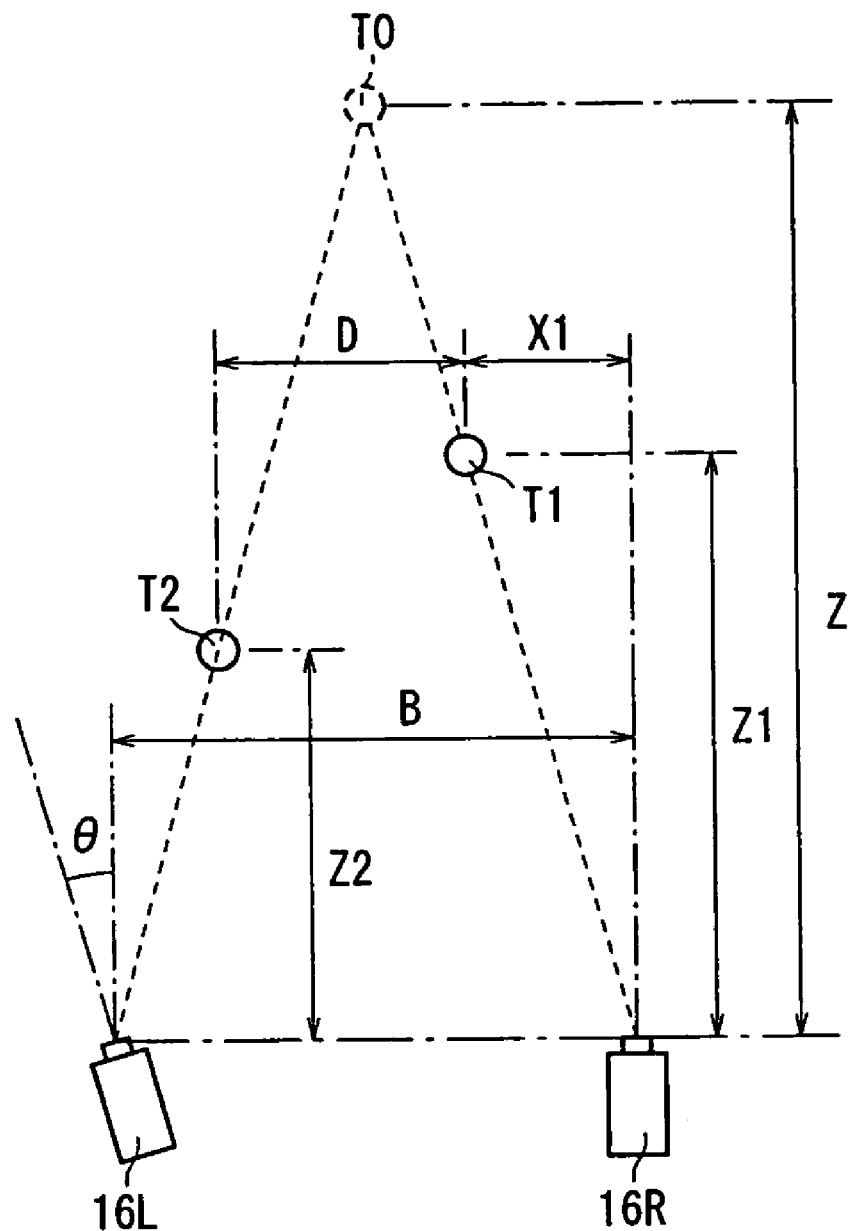
FIG. 12 is a diagram illustrative of a modified positional relationship shown in FIG. 10.

The calculation of the parallax offset value a described above is based on an arrangement where the aiming targets T1, T2 are away from the infrared cameras 16R, 16L by the same distance Zn. As shown in FIG. 12, however, the respective aiming targets T1, T2 may be arranged at arbitrary positions on the lines that connect the infrared cameras 16R, 16L and the aiming target T0. Thus, the parallax offset value a can be calculated in a similar manner in such an arrangement.

That is, a distance Z from the aiming target T0 to the infrared cameras 16R, 16L can be calculated as follows, assuming that several parameters Z1, Z2, D and X1 are determined where Z1 is a distance from a line connecting the infrared cameras 16R and 16L to the aiming target T1; Z2 is a distance from the line connecting the infrared cameras 16R and 16L to the aiming target T2; D is a distance between the aiming targets T1 and T2 obtained in the direction in which the infrared cameras 16R and 16L are arranged; and X1 is a distance between an optical axis of the infrared camera 16R as a reference imaging unit and the aiming target T1.

$$Z = B \cdot Z1 \cdot Z2/(Z1 \cdot (B+X1-D) - X1 \cdot Zn) \qquad (4)$$

Then, the reference virtual parallax dn is determined by using the calculated distance Z and the equation (1). The parallax offset value α can be calculated as a difference between the reference virtual parallax dn and the virtual parallax (dn+α) determined by the obtained images.

Otherwise, the parallax offset value α may be calculated by determining the distance Z such that the infrared camera 16L is defined as a reference imaging unit and that the distance Z is calculated by using the distance from an optical axis of the infrared camera 16L to the aiming target T2.

Further, instead of using the distances Z1, Z2, D and X1, only the positional information of the aiming target T0 as a specified point relative to the infrared cameras 16R, 16L may be given. The aiming targets T1, T2 may be arranged on the arbitrary positions on the respective lines between the aiming target T0 and the infrared cameras 16R, 16L. Then, the reference virtual parallax dn can be calculated by using the positional information.

For example, the equations of lines between the aiming target T0 and the infrared cameras 16R, 16L are obtained by the positional information, and points of intersection between the lines and an arbitrary line parallel to the line connecting the infrared cameras 16R, 16L are obtained. Thus, an arrangement similar to the arrangement shown in FIG. 10 can be set, where the aiming targets T1, T2 are arranged at the points of intersection. Then, the distance D between the points of intersection, and the distance Zn between the points of intersection and the infrared cameras 16R, 16L can be calculated, for determining the reference virtual parallax dn by the equation (3).

Further, since the positional information of the aiming target T0 as the specified point relative to the infrared cameras 16R, 16L is given beforehand, the reference virtual parallax dn may be directly calculated from the equation (1) by using the distance Z as the positional information. Then, the parallax offset value α can be calculated as a difference between the reference virtual parallax dn and the virtual parallax (dn+α) determined by the obtained images.

When the distance D between the aiming targets T1, T2 is equal to the base length B, since the distance to the aiming target T0 is infinite in the equation (2), the parallax offset value α can be calculated more accurately by using the aiming target T0 positioned at infinity. In this case, the reference virtual parallax dn is zero (dn=0), and the virtual parallax between the target images T1* and T2* is equal to the parallax offset value α. Also, the distance Zn from a line connecting the infrared cameras 16R and 16L to the aiming targets T1, T2 is arbitrary. Thus, when the distance D between the aiming targets T1 and T2 in a direction of the line connecting the infrared cameras 16R, 16L is adjusted to be equal to the base length B, the parallax offset value α can be calculated without the data of the distance Zn.

Figure 13:
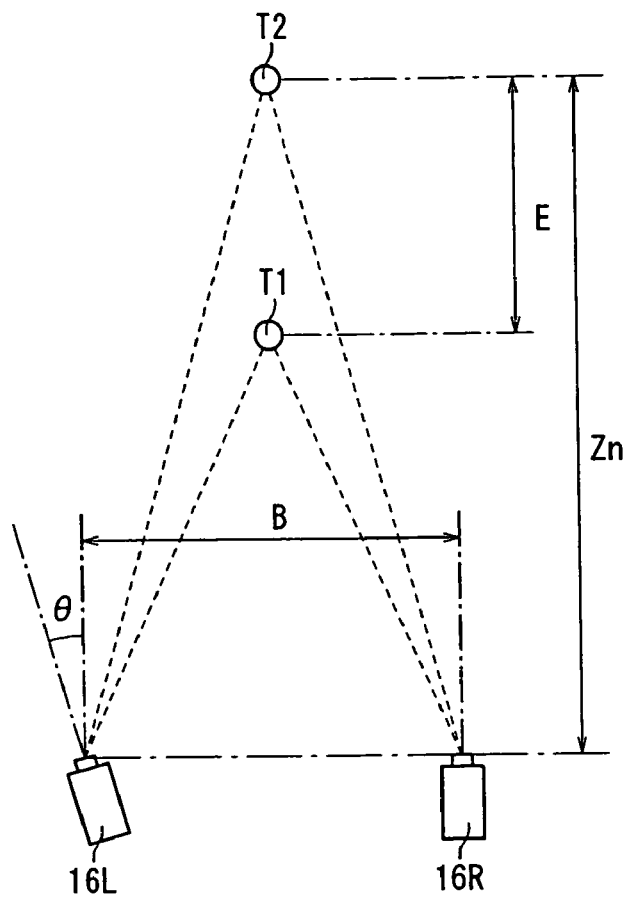
FIG. 13 is a diagram illustrative of a positional relationship of infrared cameras and aiming targets for calculating a parallax corrective value in another embodiment.
Figure 14:
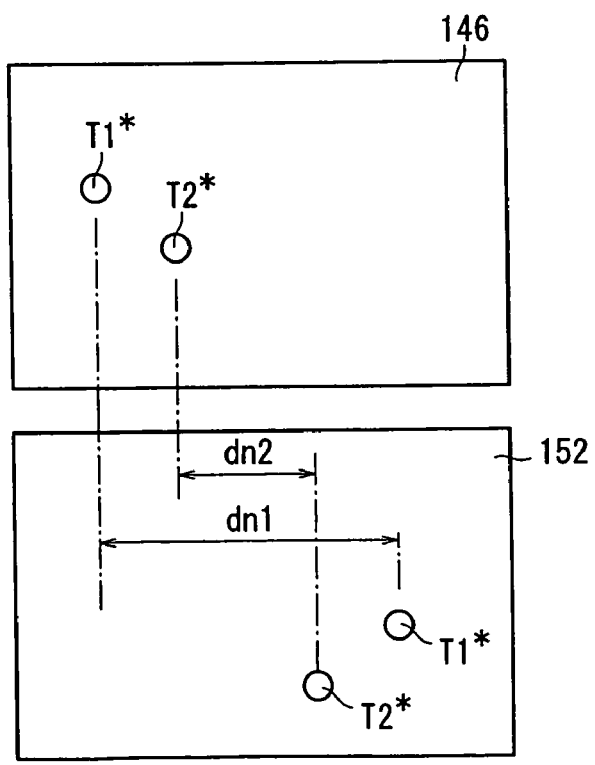
FIG. 14 is a diagram illustrative of a reference image and a searching image obtained in the positional relationship shown in FIG. 13.

Next, another embodiment for obtaining the parallax offset value α will be described below with reference to FIGS. 13 and 14.

In this embodiment, the aiming target T2 is arranged at the position away from the infrared cameras 16R, 16L by the distance Zn, and the aiming target T1 is arranged at the position away from the infrared cameras 16R, 16L by the distance (Zn−E).

After the aiming targets T1 and T2 are thus arranged, the two aiming targets T1 and T2 are imaged by the infrared cameras 16R, 16L. A first parallax dn1 between the target image T1* of the reference image 146 and the target image T1* of the searching image 152 is obtained, and a second parallax dn2 between the target image T2* of the reference image 146 and the target image T2* of the searching image 152 is obtained.

In this case, regarding the aiming target T1, the following equation (5) is obtained by using the equation (1).

$$Zn-E=f/p \cdot B/(dn1-\alpha) \quad (5)$$

Regarding the aiming target T2, the following equation (6) is obtained.

$$Zn=f/p \cdot B/(dn2-\alpha) \quad (6)$$

Then, the parallax offset value a is calculated by an equation (7), using the equations (5) and (6).

$$\alpha=dn2-f/p \cdot B/Zn \quad (7)$$

Accordingly, the distance Zn from the infrared cameras 16R, 16L to the aiming target T2 is calculated by an equation (8) below.

$$Zn=\beta \cdot E - \sqrt{((\beta \cdot E)^2 - 4 \cdot \beta \cdot E)/(2 \cdot \beta)} \quad (8)$$

$$(\beta=(dn2-dn1)/(f/p \cdot B))$$

Therefore, only the distance E between the aiming targets T1 and T2 is necessary for calculating the parallax offset value α by using the equations (7), (8).

It is not necessary that the aiming targets T1, T2 themselves are aligned on a straight line perpendicular to the line connecting the infrared cameras 16R, 16L. Only the distance E between the aiming targets T1 and T2 on such a straight line is necessary for calculating the parallax offset value α, and the aiming targets T1, T2 may be arranged arbitrarily.

The parallax corrective value as the parallax offset value α due to the relative pan angle between the optical axes of the infrared cameras 16R and 16L is thus obtained, and stored in the camera parameter memory 46 as a camera parameter. In a similar manner, the parallax offset value due to the relative pitch angle between the optical axes of the infrared cameras 16R, 16L is obtained by using the parallax in a vertical direction of the target images T1*, T T2*. Then, the parallax offset value is stored in the camera parameter memory 46 as a camera parameter.

After the camera parameters are set in the aiming mode, the normal mode is carried out using the camera parameters.

An object searching process and, when necessary, an attention drawing process, in the normal mode will be described below with reference to a flowchart shown in FIG. 15.

An image of an area in front of the vehicle 12 is obtained as a reference image by the infrared camera 16R, and an image of an area in front of the vehicle 12 is obtained as a searching image by the infrared camera 16L. The obtained images are converted into respective gray-scale images, which are stored in the image memory 44, and the image from the infrared camera 16R is converted by the binarizer 42 into a binary image, which is also stored in the image memory 44, in steps S101, S102.

The normal mode execution unit 50 extracts an object from the binary image of the reference image obtained by the infrared camera 16R in step S103. Then, the normal mode execution unit 50 searches for an object in the searching image 152, which corresponds to the object in the reference image 146, according to correlative calculations on the gray-scale images. Finally, the normal mode execution unit 50 calculates a parallax on the images 146, 152 between the objects that have been searched for, and determines a distance to the object in step S104.

Prior to the correlative calculations, the luminance signal of the reference image 146 or the searching image 152 is adjusted using the luminance adjustment LUT representative of camera parameters, such that the luminance signal of the reference image 146 obtained by the infrared camera 16R is greater than the luminance signal of the searching image 152 obtained by the infrared camera 16L. Then, correlative calculations are performed on the adjusted gray-scale images to search for the object certainly. The coordinates of the objects in the reference image 146 and the searching image 152 are corrected by an image distortion coefficient which represents a camera parameter, and the parallax between the objects that have been searched for is corrected highly accurately by using a parallax offset value α which represents a camera parameter due to a relative pan angle. The distance from the vehicle 12 to the actual object is calculated highly accurately.

Then, the two-dimensional coordinates of the object in the reference image 146 are corrected by an absolute pan angle and an absolute pitch angle of the infrared cameras 16R, 16L obtained in step S18, and a relative position represented by three-dimensional coordinates of the object in the actual space, including the distance calculated in step S104, is calculated in step S105.

The three-dimensional coordinates of the object in the actual space in step S105 are repeatedly calculated at small time intervals to calculate a moving vector of the object in step S106. Using the moving vector, road structures and vehicles are removed from the object in step S107. Then, it is determined whether there is a pedestrian or not from the shape of the remaining object in step S108.

If it is judged that there is a pedestrian in step S108, then the reference image 146 obtained by the infrared camera 16R is displayed on the HUD 18, and the image of the pedestrian is enclosed by a highlighting frame in step S109. The speaker 20 is energized to draw the driver's attention in step S110.

Although certain preferred embodiments of the present invention have been shown and described in detail, it should be understood that various changes and modifications may be made therein without departing from the scope of the appended claims.

What is claimed is:

1. An apparatus for detecting a position in an actual space of an object by imaging said object with a plurality of imaging units, comprising:
   an object extracting unit for extracting an object from images obtained by said imaging units;
   an actual space position calculating unit for calculating said position in said actual space of said object extracted by said object extracting unit;
   a corrective value calculating unit for calculating a corrective value to correct said position in said actual space calculated by said actual space position calculating unit; and
   an actual space position correcting unit for correcting said position in said actual space calculated by said actual space position calculating unit by using said corrective value calculated by said corrective value calculating unit, wherein said corrective value calculating unit images a plurality of objects arranged at predetermined positions in said actual space with said imaging units, and calculates said corrective value based on positions in images of said objects, wherein said actual space position calculating unit comprises a parallax calculating unit for calculating each of the parallaxes obtained when each of said objects is imaged by said imaging units, wherein said corrective value calculating unit calculates said corrective value based on said parallaxes of said objects arranged at predetermined positions in said actual space, and wherein said corrective value calculating unit calculates said corrective value based on a distance between said objects obtained in a direction perpendicular to a direction in which said imaging units are arranged.

2. An apparatus for detecting a position in an actual space of an object by imaging said object with two imaging units, comprising:

a virtual parallax calculating unit for calculating a distance between a first object and a second object in images as a virtual parallax, said first object and said second object being arranged in a direction in which first and second imaging units are arranged, a predetermined distance being provided between said first object and said second object, said first imaging unit obtaining said image of said first object, said second imaging unit obtaining said image of said second object, a parallax corrective value calculating unit for calculating a difference between said virtual parallax and a reference virtual parallax as a parallax corrective value, where said reference virtual parallax is defined as a distance between said first object and said second object in images when optical axes of said first and second imaging units are parallel to each other, wherein a parallax in images of one object obtained by said first and second imaging units is corrected by using said parallax corrective value.

3. An apparatus according to claim 2, wherein said predetermined distance between said first object and said second object is equal to a base length between said first imaging unit and said second imaging unit, and wherein said parallax corrective value calculating unit calculates said virtual parallax as said parallax corrective value.

4. An apparatus for detecting a position in an actual space of an object by imaging said object with two imaging units, comprising:

a first parallax calculating unit for calculating a first parallax between an image of a first object obtained by a first imaging unit and an image of said first object obtained by a second imaging unit;

a second parallax calculating unit for calculating a second parallax between an image of a second object obtained by said first imaging unit and an image of said second object obtained by said second imaging unit;

a parallax corrective value calculating unit for calculating a parallax corrective value based on said first parallax, said second parallax and a distance between said first object and said second object, wherein said first object and said second object are arranged such that a distance from said first and second imaging units to said first object is different from a distance from said first and second imaging units to said second object, and said distance is obtained in a direction perpendicular to a direction in which said first and second imaging units are arranged, and wherein a parallax in images of one object obtained by said first and second imaging units is corrected by using said parallax corrective value.

5. A method of correcting data in an apparatus that detects a position in an actual space of an object by imaging said object with two imaging units, said method comprising the steps of:

arranging a first object and a second object, said first object and said second object being away from each other by a predetermined distance in a direction in which first and second imaging units are arranged;

obtaining an image of said first object with said first imaging unit;

obtaining an image of said second object with said second imaging unit;

calculating a distance between said first object and said second object in said images as a virtual parallax; and calculating a difference between said virtual parallax and a reference virtual parallax as a parallax corrective value, where said reference virtual parallax is defined as a distance between said first object and said second object in images when optical axes of said first and second imaging units are parallel to each other, wherein said steps are effected by a programmed computer, and wherein a parallax in images of an arbitrary object obtained by said first and second imaging units is corrected by using said parallax corrective value.

6. A method according to claim 5, wherein said reference virtual parallax dn is calculated by an equation:

$$dn = f/p \cdot (B-D)/Zn$$

where f is a focal length of said first and second imaging units, p is a pixel pitch, B is a base length between said first and second imaging units, D is a distance between said first object and said second object obtained in said direction in which said first and second imaging units arranged, Zn is a distance between said first and second objects and said first and second imaging units obtained when said first and second objects are arranged in said direction in which said first and second imaging units are arranged.

7. A method of correcting data in an apparatus that detects a position in an actual space of an object by imaging said object with two imaging units, said method comprising the steps of:

arranging a first object and a second object such that a distance from first and second imaging units to said first object is different from a distance from said first and second imaging units to said second object;

obtaining an image of said first and second objects with said first imaging unit;

obtaining an image of said first and second objects with said second imaging unit;

calculating a first parallax between said image of said first object obtained by said first imaging unit and said image of said first object obtained by said second imaging unit;

calculating a second parallax between said image of said second object obtained by said first imaging unit and said image of said second object obtained by said second imaging unit;

calculating a parallax corrective value based on said first parallax, said second parallax and a distance between said first object and said second object, said distance being obtained in a direction perpendicular to a direction in which said first and second imaging units are arranged; and correcting a parallax in images of one object obtained by said first and second imaging units by using said parallax corrective value, wherein said steps are effected by a programmed computer.

8. A method according to claim 7, wherein said parallax corrective value $\alpha$ is calculated by equations:

$$Zn-L=f/p \cdot B/(dn1-\alpha)$$

$$Zn=f/p \cdot B/(dn2-\alpha)$$

where f is a focal length of said first and second imaging units, p is a pixel pitch, B is a base length between said first and second imaging units, dn1 is said first parallax, dn2 is said second parallax, E is said distance between said first and second objects obtained in said direction perpendicular to said direction in which said first and second imaging units are arranged, Zn is a distance between said second object and said first and second imaging units.

* * * * *

UNITED STATES PATENT AND TRADEMARK OFFICE
CERTIFICATE OF CORRECTION

PATENT NO. : 7,620,237 B2
APPLICATION NO. : 11/287554
DATED : November 17, 2009
INVENTOR(S) : Nagaoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Fourteenth Day of December, 2010

David J. Kappos
*Director of the United States Patent and Trademark Office*